United States Patent [19]

Cheng

[11] Patent Number: 5,425,285
[45] Date of Patent: Jun. 20, 1995

[54] AUXILIARY HANDLEBAR ASSEMBLY FOR BICYCLE

[76] Inventor: Tien-Chu Cheng, No. 65 Shui-Jing St., Yong-Yuan Village, Shin-She Hsiang Taichung Hsien, Taiwan, Prov. of China

[21] Appl. No.: 331,870

[22] Filed: Nov. 1, 1994

Related U.S. Application Data

[63] Continuation of Ser. No. 194,580, Feb. 10, 1994, abandoned.

[51] Int. Cl.6 .................. B62K 21/12; F16C 11/00
[52] U.S. Cl. ................... 74/551.8; 74/551.3; 74/551.1; 403/87; 403/103
[58] Field of Search ............ 74/551.1-551.8; 280/279; 403/375, 87, 93, 103, 98

[56] References Cited

U.S. PATENT DOCUMENTS 5,033,325  7/1991  Giard ......................... 74/551.8 X
5,285,698  2/1994  Liao .......................... 74/551.3 X

FOREIGN PATENT DOCUMENTS 2671323  7/1992  France ........................ 74/551.1
3938276  4/1991  Germany ...................... 74/551.8

*Primary Examiner*—Vinh T. Luong
*Attorney, Agent, or Firm*—Morton J. Rosenberg; David I. Klein

[57] ABSTRACT

An auxiliary handlebar assembly is provided. The auxiliary handlebar assembly includes an auxiliary handlebar having an open end and a coupler secured in the open end. The coupler includes a sleeve for engagement with a handlebar stem disposed on one end and a wedge shaped portion formed on the opposing end and engaged in the open end of the auxiliary handlebar. A bolt is engaged through the sleeve and the wedge shaped portion for engagement with a wedge member, such that the wedge member is caused to move radially outward for engagement with the auxiliary handlebar. In this manner, the auxiliary handlebar can be easily fixed to a handlebar stem by the coupler and a bent section of the auxiliary handlebar can be rotatably adjusted relative to a longitudinal axis of the coupler.

2 Claims, 2 Drawing Sheets

AUXILIARY HANDLEBAR ASSEMBLY FOR BICYCLE

This is a continuation of application Ser. No. 08/194,580 filed on Feb. 10, 1994 now abandoned.

BACKGROUND OF THE INVENTION

1. Field of the Invention

The present invention relates to a handlebar assembly, and more particularly to an auxiliary handlebar assembly for cycles.

2. Prior Art

A typical auxiliary handlebar assembly is shown in FIG. 4 and comprises a tube 40 including a sleeve 42 fixed to the free end portion of a handlebar stem 50 by a screw 43. The sleeve 42 is fixed to the tube 40 such that the tube 40 may not be rotated and adjusted about the longitudinal direction of the tube 40.

The present invention overcomes the disadvantages of conventional auxiliary handlebar assemblies.

SUMMARY OF THE INVENTION

The primary objective of the present invention is to provide an auxiliary handlebar assembly in which the auxiliary handlebar can be adjusted and rotated about the longitudinal axis thereof.

In accordance with one aspect of the invention, there is provided an auxiliary handlebar assembly comprising an auxiliary handlebar having a longitudinal axis and an open end, a coupler having a sleeve for engagement with a handlebar stem and a wedge shaped portion engaged in the open end of the auxiliary handlebar and a wedge member engaged in the open end of the auxiliary handlebar and engaged with the wedge shaped portion of the coupler. The sleeve includes an end portion, and a bolt engaged through the end portion of the sleeve, the bolt being engaged with the wedge shaped portion and wedge member. The wedge member is caused to move radially outward to engage with the auxiliary handlebar when the bolt is threaded into place, such that the auxiliary handlebar is fixed to the handlebar stem by the coupler.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
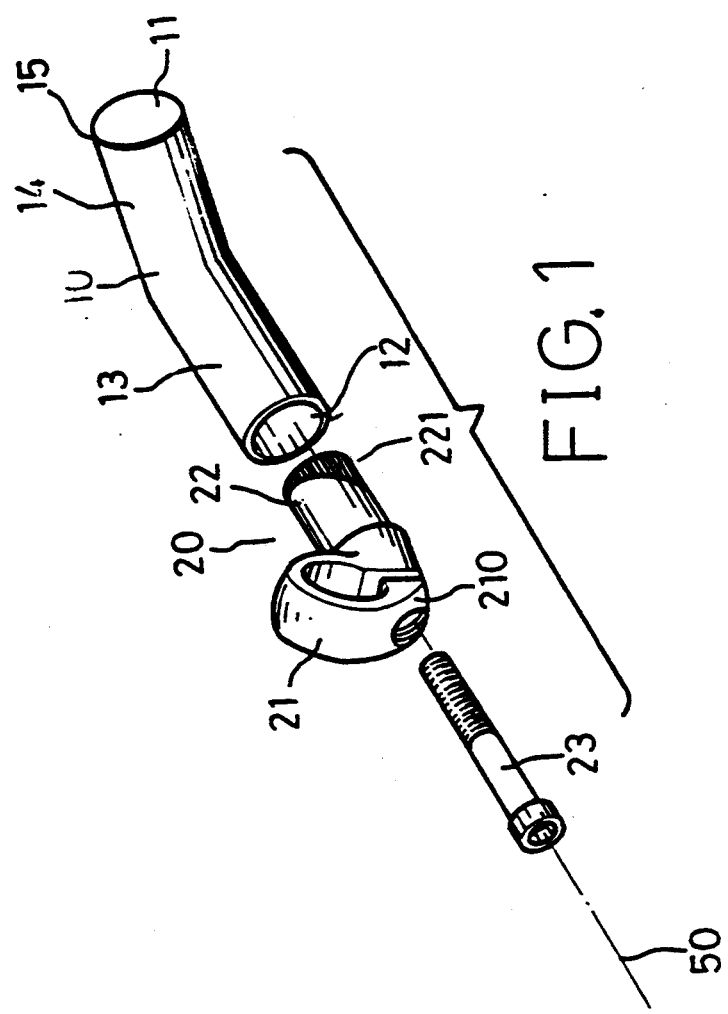
FIG. 1 is an exploded view of an auxiliary handlebar assembly in accordance with the present invention.
Figure 2:
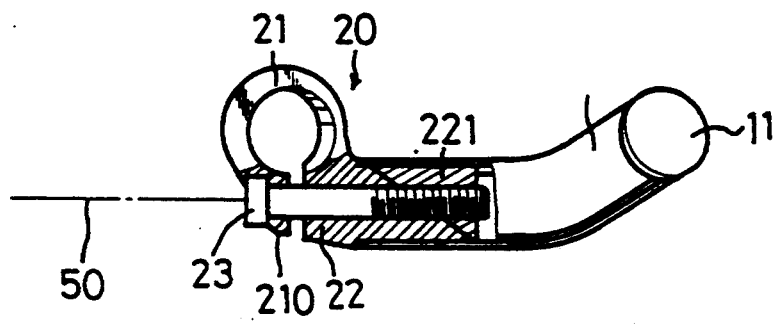
FIG. 2 is a partial cross-sectional view of the auxiliary handlebar assembly.
Figure 3:
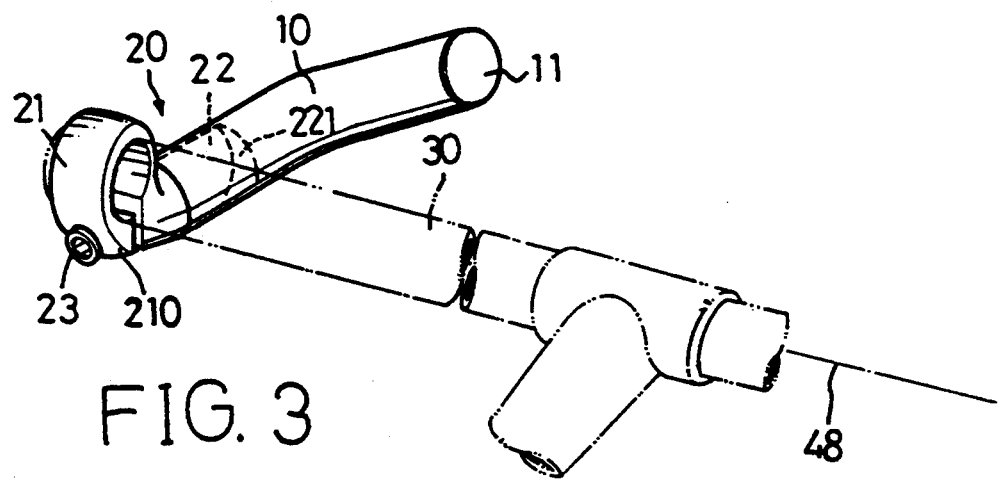
FIG. 3 is a perspective view illustrating the application of the auxiliary handlebar assembly.
Figure 4:
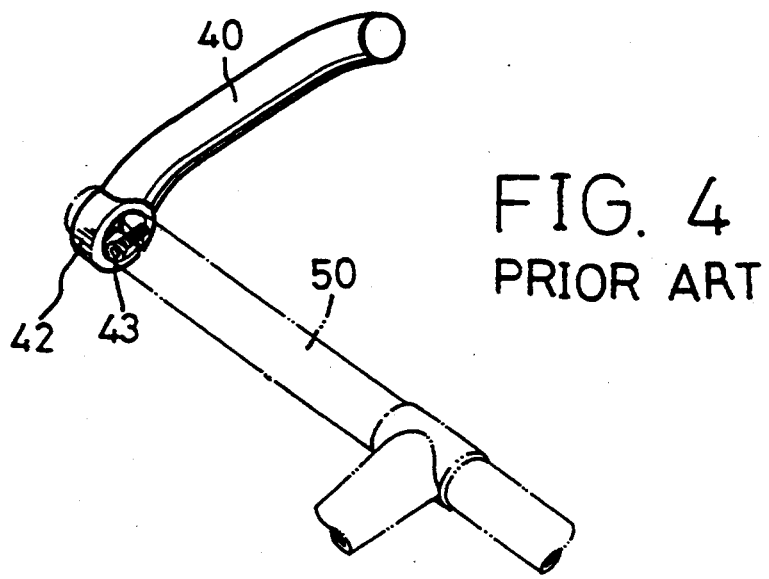
FIG. 4 is a perspective view illustrating a prior art auxiliary handlebar assembly.

Referring to FIGS. 1 and 3, an auxiliary handlebar assembly comprises an auxiliary handlebar 10 defined by a linearly directed section 13 and a bent section 14 and having a first end 15 enclosed by a cap 11 and an open second end 12, and a coupler 20 including a wedge shaped portion 22 provided on one end and engaged in the open second end 12 of the auxiliary handlebar. A sleeve 21 is provided on the other end of the coupler for engagement with the handlebar stem 30 extending in the direction defined by handlebar stem axis 48 and having an end portion 210. A wedge member 221 is engaged in the open second end of the auxiliary handlebar and engaged with the wedge shaped portion 22. A bolt 23 is engaged through the end portion 210 and the wedge shaped portion 22 and wedge 221, whereby the wedge 221 can be caused to move radially outward and in the direction of auxiliary handlebar axis 50 to engage the inner surface of the auxiliary handlebar 10. The end portion 210 of the sleeve 21 is thereby forced toward the wedge shaped portion 22 when the bolt 23 is threaded into place, such that the sleeve 21 is fixed to the handlebar stem 30 and the coupler 20 is fixed to the auxiliary handlebar 10 simultaneously.

When it is required to adjust the auxiliary handlebar, as shown in FIG. 3, it is only required that the bolt 23 be loosened. The sleeve 21 can then be rotated about the handlebar stem 30, and the bent section 14 of auxiliary handlebar 10 can be rotated about the longitudinal axis 50 thereof. The auxiliary handlebar, the coupler 20 and the handlebar stem can be easily secured together when the bolt 23 is threaded into place again.

Accordingly, the auxiliary handlebar assembly includes an auxiliary handlebar 10 having a bent section 14 which can be adjusted and rotated about the longitudinal axis 50. The auxiliary handlebar can be easily secured to the handlebar stem 30.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An auxiliary handlebar assembly and a handlebar stem combination, said combination comprising an auxiliary handlebar including an open end, a coupler including a sleeve engaged on said handlebar stem and including a first wedge engaged in said open end of said auxiliary handlebar, said sleeve including a first end portion one piece formed with said first wedge and including a second end portion aligned with said first wedge, a second wedge engaged in said open end of said auxiliary handlebar and engaged with said first wedge, and a bolt engaged with said second end of said sleeve and engaged with said first and second wedges, said second wedge being caused to move radially outward to engage with said auxiliary handlebar so as to fix said auxiliary handlebar to said handlebar stem when said bolt is threaded into place.

2. An auxiliary handlebar system comprising:
   (a) a longitudinally directed handlebar stem (30) defining a handlebar stem axis (48);
   (b) a bent auxiliary handlebar (10) defined by a linearly directed auxiliary handlebar section (13) having a auxiliary handlebar axis (50) extending normal said handlebar stem axis (48), and a bent section (14) extending angularly to said linearly directed auxiliary handlebar section (13), said linearly directed auxiliary handlebar section (13) having an open end (12);
   (c) coupler means (20) for securing said auxiliary handlebar (10) to one end of said handlebar stem (30), said coupler means (20) including a sleeve member (21) formed on a first end thereof for engagement with said handlebar stem (30), said coupler means having a wedge shaped portion (22) formed on a second end thereof and inserted within said open end (12) of said linearly directed auxiliary handlebar section (13), said coupler means including a wedge member (221) displaceable within said linearly directed auxiliary handlebar section (13) and a bolt member (23) threadedly secured to and extending through said sleeve member (21) and said wedge shaped portion (22) and threadedly engaged to said wedge member (221) for displacing said wedge member (221) toward said wedge shaped portion (22) of said coupler means (20) for simultaneously fixedly securing said bent auxiliary handlebar (10) to said handlebar stem (30) and angularly securing said bent section (14) about said auxiliary handlebar axis (50).

* * * * *